United States Patent
Blackbourn et al.

(10) Patent No.: US 10,894,909 B2
(45) Date of Patent: Jan. 19, 2021

(54) INDUCIBLY DEGRADABLE POLYACETAL COMPOSITIONS FOR USE IN SUBTERRANEAN FORMATIONS

(71) Applicant: SHELL OIL COMPANY, Houston, TX (US)

(72) Inventors: Robert Lawrence Blackbourn, Houston, TX (US); Paul Richard Weider, Houston, TX (US); Jonathan Joseph Brege, Spring, TX (US); Allen Dale Gabrysch, Paige, TX (US); Ryan Matthew Van Zanten, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 66 days.

(21) Appl. No.: 15/573,034

(22) PCT Filed: May 10, 2016

(86) PCT No.: PCT/US2016/031620
§ 371 (c)(1),
(2) Date: Nov. 9, 2017

(87) PCT Pub. No.: WO2016/183069
PCT Pub. Date: Nov. 17, 2016

(65) Prior Publication Data
US 2018/0105730 A1    Apr. 19, 2018

Related U.S. Application Data

(60) Provisional application No. 62/160,194, filed on May 12, 2015.

(51) Int. Cl.
| | | |
|---|---|---|
| C09K 8/035 | (2006.01) | |
| C09K 8/50 | (2006.01) | |
| C09K 8/62 | (2006.01) | |

(52) U.S. Cl.
CPC ............ *C09K 8/035* (2013.01); *C09K 8/50* (2013.01); *C09K 8/62* (2013.01)

(58) Field of Classification Search
CPC ............ C09K 8/035; C09K 8/50; C09K 8/62
See application file for complete search history.

(56) References Cited

U.S. PATENT DOCUMENTS

| | | | |
|---|---|---|---|
| 4,669,545 | A | 6/1987 | Slaugh |
| 4,716,964 | A | 1/1988 | Erbstoesser et al. |
| 4,947,933 | A | 8/1990 | Jones et al. |
| 5,813,457 | A | 9/1998 | Giroux et al. |
| 7,625,846 | B2 | 12/2009 | Cooke |
| 8,025,104 | B2 | 9/2011 | Cooke |

(Continued)

FOREIGN PATENT DOCUMENTS

| | | |
|---|---|---|
| JP | H0543639 A | 2/1993 |
| WO | 2015069681 A1 | 5/2015 |

OTHER PUBLICATIONS

International Search Report and Written Opinion received for PCT Patent Application No. PCT/US2016/031620, dated Aug. 8, 2016, 12 pages.

(Continued)

*Primary Examiner* — Alicia Bland

(57) ABSTRACT

Inducibly degradable compositions comprising polyacetal and associated methods and systems.

24 Claims, 1 Drawing Sheet

(56) References Cited

U.S. PATENT DOCUMENTS

| | | |
|---|---|---|
| 8,215,385 B2 | 7/2012 | Cooke |
| 8,297,364 B2 | 10/2012 | Agrawal et al. |
| 8,439,108 B2 | 5/2013 | Cooke |
| 8,899,317 B2 | 12/2014 | Frazier |
| 9,033,044 B2 | 5/2015 | Huang |
| 9,033,046 B2 | 5/2015 | Andrew et al. |
| 9,290,821 B2 | 3/2016 | Blackbourn et al. |
| 2002/0142919 A1 | 10/2002 | Constien |
| 2003/0060374 A1 | 3/2003 | Cooke |
| 2004/0231845 A1* | 11/2004 | Cooke, Jr. ............ C08G 63/06 166/279 |
| 2006/0185846 A1* | 8/2006 | Powell .................. C09K 8/502 166/276 |
| 2007/0032386 A1 | 2/2007 | Abad et al. |
| 2009/0075845 A1 | 3/2009 | Abad et al. |
| 2009/0084554 A1* | 4/2009 | Williamson ............ C09K 8/02 166/308.4 |
| 2011/0240064 A1* | 10/2011 | Wales ..................... C09D 5/14 134/26 |
| 2013/0133897 A1 | 5/2013 | Baihly et al. |
| 2013/0240200 A1 | 9/2013 | Frazier |
| 2014/0116701 A1* | 5/2014 | Tang ..................... C09K 8/725 166/292 |
| 2016/0258256 A1* | 9/2016 | Nguyen ............... E21B 43/088 |

OTHER PUBLICATIONS

U.S. Appl. No. 61/901,098, filed Nov. 7, 2013.
Kern et al., "Der Abbau Von Polyoxymethylenen. Poloxymethylene. 14. Mitteilung", Die Makromolekulare Chemie, vol. 40, Issue No. 1, May 16, 1960, pp. 101-117, XP055292027. (English abstract).

* cited by examiner

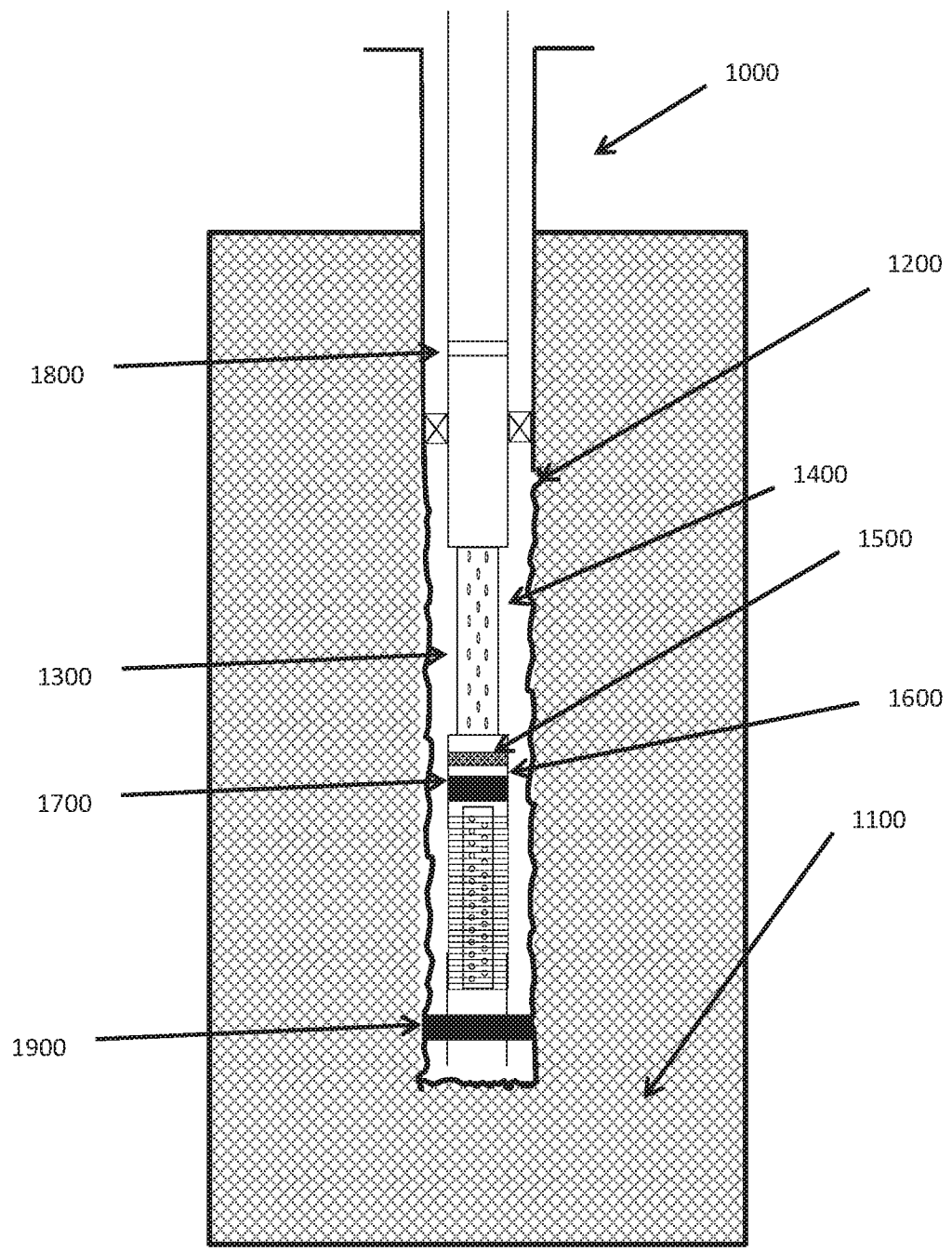

INDUCIBLY DEGRADABLE POLYACETAL COMPOSITIONS FOR USE IN SUBTERRANEAN FORMATIONS

CROSS REFERENCE TO EARLIER APPLICATIONS

This is a US national stage application of International application No. PCT/US2016/031620, filed on May 10, 2016, which claims benefit of priority of U.S. provisional application No. 62/160,194, filed on May 12, 2015, which is incorporated herein by reference in its entirety.

BACKGROUND

The present disclosure relates generally to inducibly degradable compositions comprising polyacetal. More specifically, in certain embodiments, the present disclosure relates to inducibly degradable compositions comprising polyacetal suitable for use in subterranean formations and associated methods and systems.

Degradable materials have numerous uses in wellbore applications. Degradable materials may be used as a component in fluids such as completion fluids, drilling fluids, perforating fluids, gravel pack fluids, and fracturing fluids. In such fluids, the use of a degradable material may be desirable in order to minimize formation damage from solids and remediation activities. Examples of conventional wellbore fluids comprising degradable materials are described in U.S. Patent Application Publication Nos. 2003/0060374 and 2002/0142919, the entireties of which are hereby incorporated by reference.

In addition to their uses in fluids, degradable materials also may also comprise useful solids that are placed into subterranean formations. Examples of solids include ball sealers, gaskets, and sand control screens. These solids may be required for a temporary functionality. Once this functionality is no longer required, it may be desirable that these solids degrade. Examples of conventional solids comprising degradable materials are described in U.S. Patent Application Publication Nos. 2002/0142919 and 2004/0231845 and U.S. Pat. Nos. 7,625,846, 8,025,104, 8,215,385, 8,439,108, and 8,899,317, the entireties of which are hereby incorporated by reference.

Conventional degradable materials for use in subterranean formations may typically be made of easily hydrolyzed materials such as polylactic acid, poly hydroxyalkanoates, and polyglycolic acid. These materials degrade by hydrolyzing when exposed to an aqueous environment. Although these materials may be an excellent material for many applications, their effectiveness depends on many factors. The rate of degradation of these materials may vary based upon factors such as temperature, time, crystallinity, pH, and salinity. Thus, these materials may not be suitable for use in many environments, such as heavy brine environments. Furthermore, these materials do not release a strong acid when they hydrolyze, but rather only release an organic acid. Depending on the application, these organic acids may not be suitable to fully remediate the material.

It is desirable to develop degradable compositions useful in subterranean formations that do not suffer from any of the drawbacks of conventional degradable materials.

SUMMARY

The present disclosure relates generally to inducibly degradable compositions comprising polyacetal. More specifically, in certain embodiments, the present disclosure relates to inducibly degradable compositions comprising polyacetal suitable for use in subterranean formations and associated methods and systems.

In one embodiment the present disclosure provides an inducibly degradable composition comprising polyacetal.

In another embodiment, the present invention provides a method comprising: providing an inducibly degradable composition comprising polyacetal and placing the inducibly degradable composition into a subterranean formation.

In another embodiment, the present invention provides a method comprising: providing an inducibly degradable composition comprising polyacetal; placing the inducibly degradable composition into a subterranean formation; and degrading the inducibly degradable composition.

The features and advantages of the present disclosure will be readily apparent to those skilled in the art. While numerous changes may be made by those skilled in the art, such changes are within the spirit of the disclosure.

BRIEF DESCRIPTION OF THE DRAWINGS

A more complete and thorough understanding of the present embodiments and advantages thereof may be acquired by referring to the following description taken in conjunction with the accompanying drawings.

FIG. 1 is an illustration of several inducibly degradable compositions in accordance with certain embodiments of the present disclosure.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to inducibly degradable compositions comprising polyacetal. More specifically, in certain embodiments, the present disclosure relates to inducibly degradable compositions comprising polyacetal suitable for use in subterranean formations and associated methods and systems.

One desirable attribute of the inducibly degradable compositions discussed herein is that they may degrade in a more controlled manner than conventional degradable materials. Another desirable attribute is that the inducibly degradable compositions described herein may be compatible for use in a heavy brine environment. Another desirable attribute of the inducibly degradable compositions discussed herein is that they may form a strong acid once they degrade. Yet another desirable attribute is that the inducibly degradable compositions may be suitable for use in a broader temperature range than conventional degradable materials.

In certain embodiments, the inducibly degradable compositions discussed herein are useful in deep-water wells with temperatures in the range of 120° F. to 320° F. In certain embodiments, the inducibly degradable compositions discussed herein are capable of providing the viscous aqueous fluids, the protection equipment, and the flow diversion equipment necessary for completing jobs in such wells. In certain embodiments, the inducibly degradable material in such fluids and equipment is capable of degrading into an aqueous soluble material once the fluids and equipment have performed their desired tasks.

In certain embodiments, the present disclosure provides an inducibly degradable composition comprising polyacetal. In certain embodiments, the polyacetal in the inducibly degradable composition may be inducibly degradable. As used herein, the term "inducibly degradable" refers to materials that are stable to aqueous hydrolysis until they are induced to degrade. In certain embodiments, the inducibly degradable materials may be induced to degrade by reacting them with an inducer. As used herein, the term "inducer" refers to material that is capable of inducing an inducibly degradable material to degrade. Examples of suitable inducers include sulfur dioxide, brines, and strong acids such as alpha-hydroxy sulfonic acids.

In certain embodiments, the polyacetal present in the inducibly degradable material may degrade in the presence of sulfur dioxide and water and/or sulfurous acid generated by reaction of the sulfur dioxide with water to form formaldehyde. In certain embodiments, the polyacetal present in the inducibly degradable material may degrade at temperatures in the range of from 120° F. to 320° F. In certain embodiments, the formaldehyde may be capable of being dissolved in an aqueous wellbore environment. In certain embodiments, the formaldehyde may be capable of reacting water and sulfur dioxide present in the wellbore environment to form an alpha hydroxy sulfonic acid. In certain embodiments, the sulfur dioxide may be introduced into the wellbore environment or may be generated by a sulfur dioxide precursor present in the wellbore environment. In certain embodiments, the alpha hydroxy sulfonic acid may further induce the degradation of the inducibly degradable material.

In certain embodiments, the polyacetal present in the inducibly degradable material may degrade in the presence other strong acids or halides. In certain embodiments, the rate of the induced degradation may be controlled by controlling the concentration of the strong acid or halide.

In certain embodiments, the polyacetal present in the inducibly degradable composition may be highly crystalline. In certain embodiments, the polyacetal may have a varying degree of crystallinity. In certain embodiments, the polyacetal may have a crystallinity in the range of from 75% to 85%.

In certain embodiments, the polyacetal may be a homopolymer or a copolymer. In certain embodiments, the polyacetal may be a co-polymer of trioxane and ethylene oxide.

In certain embodiments, the polyacetal may have a melting point temperature in the range of from 150° C. to 185° C. In certain, the polyacetal may have a melting point temperature in the range of from 175° C. to 181° C. In other embodiments, the polyacetal may have a melting point temperature in the range of from 162° C. to 173° C.

In certain embodiments, the inducibly degradable composition may be a fluid and/or suspended in a fluid. In certain embodiments, the fluid may be a completion fluid, a drilling fluid, a perforating fluid, a gravel pack fluid, or a fracturing fluid. In certain embodiments, the inducibly degradable composition may comprise a fluid comprising base fluid and the polyacetal.

In certain embodiments, the base fluid may comprise an aqueous, saline, non-saline, or hydrocarbon based fluid.

In certain embodiments, the polyacetal may be present in the base fluid in an amount in the range of from 0.25% to 95% by volume of the fluid. In certain embodiments, the polyacetal may be present in the base fluid in an amount in the range of from 1% to 90% by volume of the fluid. In certain embodiments, the polyacetal may be present in the base fluid in an amount in the range of from 5% to 80% by volume of the fluid. In certain embodiments, the polyacetal may be present in the base fluid in an amount in the range of from 10% to 40% by volume of the fluid. In such embodiments, the polyacetal may be present in the base fluid as discrete particles and/or fibers.

In certain embodiments, the fluid may further comprise common additives such as viscosifiers, fluid loss control products, suspending agents, corrosion inhibitors, weighting agents, or emulsifiers. In certain embodiments, the fluid may also comprise polylactic acid, polyglycoclic acid, or other conventional degradable materials. In certain embodiments, the fluid may further comprise acid sensitive polymers such as nylon.

In certain embodiments, the fluid may further comprise sulfur dioxide or a sulfur dioxide precursor. In certain embodiments, the sulfur dioxide precursor may be capable of releasing sulfur dioxide upon thermal decomposition or by aqueous hydrolysis. Suitable examples of sulfur dioxide precursors include sulfones and sulfites. Examples of suitable sulfones include sulfone adducts of butadiene, sulfone adducts of piperylene, and sulfone adducts of isoprene. Examples of suitable sulfites include sulfite esters such as ethylene sulfite, dimethyl sulfite, diethyl sulfite, 1,2-propylene sulfite, and 1,3-propylene sulfite.

In certain embodiments, the fluid may comprise sulfur dioxide or a sulfur dioxide precursor at a concentration in the range of from 0 mol % to 20 mol %. In certain embodiments, the fluid may comprise sulfur dioxide or a sulfur dioxide precursor at a concentration in the range of from 5 mol % to 16 mol %. In certain embodiments, the fluid may comprise sulfur dioxide or a sulfur dioxide precursor at a concentration in the range of from 7.5 mol % to 10 mol %.

In certain embodiments, the inducibly degradable composition may be a solid. Examples of solids include sand control screens, liners, gaskets, ball sealers, flow diverters, flapper valves, and plugs.

In certain embodiments, the inducibly degradable composition may comprise a sand control screen. Examples of conventional sand control screens are described in U.S. Patent Application Publication No. 2004/0231845, the entirety of which is hereby incorporated by reference. In certain embodiments, the sand control screen may have the same configuration of any sand control screen described in U.S. Patent Application Publication No. 2004/0231845 with the exception that at least a portion of the sand control screen comprises polyacetal. In certain embodiments, the sand control screen may have a polyacetal coating. In certain embodiments, the polyacetal is present in the inducibly degradable composition as a coating of a surface of the sand control screen. In certain embodiments, the polyacetal may be screen protector for the sand control screen. In certain embodiments, the sand control screen may consist of polyacetal. In certain embodiments, a portion of the sand control screen may comprise polyacetal. In certain embodiments, the sand control screen may further comprise a sulfur dioxide precursor. In certain embodiments, the sand control screen may be coated with a sulfur dioxide precursor. In certain embodiments, the sand control screen may further comprise a triggering agent.

In certain embodiments, the inducibly degradable composition may comprise a liner. Examples of conventional liners are described in U.S. Patent Application Publication No. 2004/0231845, the entirety of which is hereby incorporated by reference. In certain embodiments, the liner may have the same configuration of any liner described in U.S.

Patent Application Publication No. 2004/0231845 with the exception that at least a portion of the liner comprises polyacetal. In certain embodiments, the liner may have a polyacetal coating. In certain embodiments, the polyacetal is present in the inducibly degradable composition as a coating of a surface of the liner. In certain embodiments, the liner may consist of polyacetal. In certain embodiments, a portion of the liner may comprise polyacetal. In certain embodiments, the liner may further comprise a sulfur dioxide precursor. In certain embodiments, the liner may be coated with a sulfur dioxide precursor. In certain embodiments, the liner may further comprise a triggering agent.

In certain embodiments, the inducibly degradable composition may comprise a gasket. In certain embodiments, the gasket may have the same configuration of any conventional gasket with the exception that at least a portion of the gasket comprises polyacetal. In certain embodiments, the gasket may have a polyacetal coating. In certain embodiments, the polyacetal is present in the inducibly degradable composition as a coating of a surface of the gasket. In certain embodiments, the gasket may consist of polyacetal. In certain embodiments, a portion of the gasket may comprise polyacetal. In certain embodiments, the gasket may further comprise a sulfur dioxide precursor. In certain embodiments, the gasket may be coated with a sulfur dioxide precursor. In certain embodiments, the gasket may further comprise a triggering agent.

In certain embodiments, the inducibly degradable composition may comprise a ball sealer. Examples of conventional ball sealers are described in U.S. Pat. No. 4,716,964, the entirety of which is hereby incorporated by reference. In certain embodiments, the ball sealer may have the same configuration of any ball sealer described in U.S. Pat. No. 4,716,964 with the exception that at least a portion of the ball sealer comprises polyacetal. In certain embodiments, the ball sealer may have a polyacetal coating. In certain embodiments, the polyacetal is present in the inducibly degradable composition as a coating of a surface of the ball sealer. In certain embodiments, the ball sealer may consist of polyacetal. In certain embodiments, a portion of the ball sealer may comprise polyacetal. In certain embodiments, the ball sealer may further comprise a sulfur dioxide precursor. In certain embodiments, the ball sealer may be coated with a sulfur dioxide precursor. In certain embodiments, the ball sealer may further comprise a triggering agent.

In certain embodiments, the inducibly degradable composition may comprise a flow diverter. Examples of conventional flow diverters are described in U.S. Pat. No. 5,813,457, the entirety of which is hereby incorporated by reference. In certain embodiments, the flow diverter may have the same configuration of any flow diverter described in U.S. Pat. No. 5,813,457 with the exception that at least a portion of the flow diverter comprises polyacetal. In certain embodiments, the flow diverter may have a polyacetal coating. In certain embodiments, the polyacetal is present in the inducibly degradable composition as a coating of a surface of the flow diverter. In certain embodiments, the flow diverter may consist of polyacetal. In certain embodiments, a portion of the flow diverter may comprise polyacetal. In certain embodiments, the flow diverter may further comprise a sulfur dioxide precursor. In certain embodiments, the flow diverter may be coated with a sulfur dioxide precursor. In certain embodiments, the flow diverter may further comprise a triggering agent.

In certain embodiments, the inducibly degradable composition may comprise a flapper valve. Examples of conventional flapper valves are described in U.S. Patent Application Publication No. 2013/0133897, the entirety of which is hereby incorporated by reference. In certain embodiments, the flapper valve may have the same configuration of any flapper valve described in U.S. Patent Application Publication No. 2013/0133897 with the exception that at least a portion of the flapper valve comprises polyacetal. In certain embodiments, the flapper valve may have a polyacetal coating. In certain embodiments, the polyacetal is present in the inducibly degradable composition as a coating of a surface of the flapper valve. In certain embodiments, the flapper valve may consist of polyacetal. In certain embodiments, a portion of the flapper valve may comprise polyacetal. In certain embodiments, the flapper valve may further comprise a sulfur dioxide precursor. In certain embodiments, the flapper valve may be coated with a sulfur dioxide precursor. In certain embodiments, the flapper valve may further comprise a triggering agent.

In certain embodiments, the inducibly degradable composition may comprise a plug. Examples of conventional plugs are described in U.S. Pat. No. 8,899,317, the entirety of which is hereby incorporated by reference. In certain embodiments, the plug may have the same configuration of any plug described in U.S. Pat. No. 8,899,317 with the exception that at least a portion of the plug comprises polyacetal. In certain embodiments, the plug may have a polyacetal coating. In certain embodiments, the polyacetal is present in the inducibly degradable composition as a coating of a surface of the plug. In certain embodiments, the plug may consist of polyacetal. In certain embodiments, the plug may further comprise a sulfur dioxide precursor. In certain embodiments, the plug may be coated with a sulfur dioxide precursor. In certain embodiments, the plug may further comprise a triggering agent.

In certain embodiments, the present invention provides a method comprising: providing an inducibly degradable composition that comprises polyacetal and placing the inducibly degradable composition into a subterranean formation.

In certain embodiments, the inducibly degradable composition may comprise any inducibly degradable composition discussed above. In certain embodiments, the subterranean formation may comprise any subterranean formation penetrated by a wellbore. Examples of suitable subterranean formations include any subterranean formation penetrated by a wellbore with temperature in the range of from 120° F. to 320° F.

In certain embodiments, the inducibly degradable composition may be placed into the subterranean formation by any conventional means. Means for placing drilling, completion, and work-over fluids and sand control screens, liners, gaskets, ball sealers, flow diverters, and plugs are well known in the art.

In certain embodiments, the inducibly degradable composition may be placed into the subterranean formation to form a wellbore system. FIG. 1 illustrates a wellbore system 1000 comprising various inducibly degradable compositions. In certain embodiments, wellbore system 1000 may comprise subterranean formation 1100, wellbore 1200, sand control screen 1300, liner 1400, one or more gaskets 1500, one or more ball sealers 1600, one or more flow diverters 1700, one or more flapper valves 1800, and/or one or more plugs 1900.

In certain embodiments, the method may further comprise degrading the inducibly degradable composition. In certain embodiments, degrading the inducibly degradable composition may comprise allowing a portion of the polyacetal present in the inducibly degradable composition to react with an inducer.

In certain embodiments, allowing a portion of the polyacetal present in the inducibly degradable composition to react with an inducer comprises allowing a portion of the polyacetal present in the inducibly degradable composition to react with a brine. In such embodiments, the portion of the polyacetal present in the inducibly degradable composition may degrade to produce formaldehyde. In certain embodiments, the formaldehyde may be capable of being dissolved in an aqueous wellbore environment. In certain embodiments, a portion or all of the polyacetal present in the inducibly degradable composition may degrade.

In certain embodiments, the brine may be introduced to the wellbore as a neat component, an emulsion, or a gel. In certain embodiments, the brine may be introduced into the subterranean formation before, after, or at the same time the inducibly degradable composition is introduced into the subterranean formation. In certain embodiments, the inducibly degradable composition may comprise the brine.

In certain embodiments, allowing a portion of the polyacetal present in the inducibly degradable composition to react with an inducer comprises allowing a portion of the polyacetal present in the inducibly degradable composition to react with a strong acid. In such embodiments, the portion of the polyacetal present in the inducibly degradable composition may degrade to produce formaldehyde. In certain embodiments, the formaldehyde may be capable of being dissolved in an aqueous wellbore environment. In certain embodiments, a portion or all of the polyacetal present in the inducibly degradable composition may degrade.

In certain embodiments, the strong acid may be introduced to the wellbore as a neat component, aqueous or non-aqueous solution, or a gel. In certain embodiments, the strong acid may be introduced into the subterranean formation before, after, or at the same time the inducibly degradable composition is introduced into the subterranean formation. In certain embodiments, the inducibly degradable composition may comprise the strong acid.

In certain embodiments, allowing a portion of the polyacetal present in the inducibly degradable composition to react with an inducer comprises allowing a portion of the polyacetal present in the inducibly degradable composition to react with sulfur dioxide and/or sulfurous acid generated by reaction of the sulfur dioxide with water. In such embodiments, the portion of the polyacetal present in the inducibly degradable composition may degrade to produce formaldehyde. In certain embodiments, the formaldehyde may be capable of being reacting with sulfur dioxide present in the well bore to form an alpha hydroxy sulfonic acid. In certain embodiments, the formaldehyde may react with sulfur dioxide present in the well bore to form an alpha hydroxy sulfonic acid. In certain embodiments, the alpha hydroxy sulfonic acid may further degrade the polyacetal. In such embodiments, the degradation of the polyacetal may be an autocatalytic reaction. In certain embodiments, a portion or all of the polyacetal present in the inducibly degradable composition may degrade.

In certain embodiments, the sulfur dioxide and/or sulfurous acid may be introduced to the wellbore as a neat component, an aqueous or non-aqueous solution, or a gel. In certain embodiments, the sulfur dioxide and/or sulfurous acid may be introduced into the subterranean formation before, after, or at the same time the inducibly degradable composition is introduced into the subterranean formation.

In certain embodiments, the inducibly degradable composition may comprise the sulfur dioxide and/or sulfurous acid.

In certain embodiments the sulfur dioxide may be generated in situ from a sulfur dioxide precursor present in the subterranean formation. In certain embodiments the sulfur dioxide precursor may be introduced to the wellbore as a neat component, an aqueous or non-aqueous solution, or a gel. In certain embodiments, the sulfur dioxide precursor may be introduced into the subterranean formation before, after, or at the same time the inducibly degradable composition is introduced into the subterranean formation. In certain embodiments, the inducibly degradable composition may comprise the sulfur dioxide precursor.

To facilitate a better understanding of the present invention, the following examples of certain aspects of some embodiments are given. In no way should the following examples be read to limit, or define, the scope of the invention.

EXAMPLES

Example 1—Polyacetal Homo-Polymer in Water

Six grams of ~41,000 MW POM (Polysciences, Inc. polyacetal) homo-polymer pellets were placed into 14 g water in a glass pressure tube. 30% w of the tube contents were solid POM. The tube was then placed without agitation into a silicon oil bath previously heated to 250° F. The temperature was maintained for 72 hours. No noticeable degradation of the pellets was observed.

Example 2—Polyacetal Homo-Polymer in Dimethyl Sulfite and Water

The pressure tube and contents used in Example 1 were removed from the silicon oil bath and cooled to room temperature. The tube was opened and 5.15 g of dimethyl sulfite (99% Sigma-Aldrich) was added. The tube was resealed, placed back in the silicon oil bath where the temperature was still controlled at 250° F. Within 2 hours, it was observed that the pellets were completely degraded and a clear homogeneous solution was produced. The tube and contents were then removed from the silicon oil bath and cooled to room temperature. The resulting clear solution was stable at room temperature and analyzed by 1H NMR. The NMR analysis showed the generation of nearly 21% w alpha hydroxymethane sulfonic acid and proportional methanol from the dimethyl sulfite hydrolysis reaction.

Example 3—Polyacetal Homo-Polymer and Ethylene Sulfite in a 1:1 Mole Ratio to Produce Acid 1.13 g of 41,000 MW POM homopolymer pellets, 3.96 g of ethylene sulfite (>99%, Aldrich), and 19.0 g of water were placed in a pressure tube. The POM and ethylene sulfite being in approximately a 1 to 1 mole ratio. The pressure tube was then placed in the silicon oil bath being held at 250° F. with no agitation. In 15 minutes nearly all of the POM solid present in the pressure tube had been visibly reacted into solution. At 1 hour no traces of solid POM could be seen. The tube was then left for an addition 1.5 hours before being removed from the silicon oil bath and cooled to room temperature. The resulting clear solution was stable at room temperature and analyzed by 1H NMR. The NMR analysis showed the generation of nearly 17.3% w alpha hydroxymethane sulfonic acid and proportional ethylene glycol content from the ethylene sulfite hydrolysis reaction. The new solution was able to dissolve a near stoichiometric 1.85 g of CaCO3 at room temperature.

Example 4—Polyacetal Homo-Polymer and 10% w Acetic Acid and 7% w KCl Brine Solution Three grams of ~41,000 MW POM and 7 g of a solution (10% w acetic acid and 7% w KCl in water) were placed into a glass pressure tube. 30% w of the tube contents being solid POM. The tube was then placed without agitation into a silicon oil bath previously heated to 200° F. The temperature was maintained for 24 hours. No noticeable degradation of the pellets was observed.

Example 5—Polyacetal Homopolymer and 5% w Ethylene Sulfite and 7% w KCl Brine Solution Three grams of ~41,000 MW POM and 7 g of a solution (5% w ethylene sulfite and 7% w KCl in water) were placed into a glass pressure tube. 30% w of the tube contents being solid POM. The tube was then placed without agitation into a silicon oil bath previously heated to 200° F. Within 12 hours the POM solid present in the pressure tube had been all visibly reacted into solution and the solution was completely clear.

Example 6—Polyacetal Copolymer and Xanthan Solutions without Acid Generation and MgOx 4.2 g of POM copolymer pellets (Cellanese Hostaform®) and 6 g of a viscous Xanthan solution (60 pounds per 1000 gallons food grade Xanthan, 1% V acetic acid, 2 pounds per barrel MgO 5% w NH4Cl) were placed into a glass pressure tube (pH>7.0). Approximately 41% w of the tube contents being solid POM copolymer. The tube was then placed without agitation into a silicon oil bath previously heated to 253° F. After nearly 2 days the solid POM copolymer was still present with some yellowing of the solution.

Example 7—Polyacetal Copolymer and Xanthan Solutions with Acid Generation 4.2 g of POM copolymer pellets (Celanese Hostaform®) and 6 g of a viscous Xanthan solution (60 pounds per 1000 gallons food grade Xanthan, 1% V acetic acid, no MgO, 5% w NH4Cl) were placed into a glass pressure tube (pH~2.75). Approximately 41% w of the tube contents being solid POM copolymer. The tube was then placed without agitation into a silicon oil bath previously heated to 253° F. After 8 hours the solid POM copolymer was reacted completely into solution, but the xanthan viscosity was still noticeable

Example 8—Polyacetal Copolymer and Xanthan Solutions with a Small Amount of Strong Acid Generation 4.2 g of POM copolymer pellets (Celanese Hostaform®) and 6 g of a viscous Xanthan solution (60 pounds per 1000 gallons food grade Xanthan, 0.5% w ethylene sulfite, 1% V acetic acid, no MgO, 5% w NH4Cl) were placed into a glass pressure tube. Approximately 41% w of the tube contents being solid POM copolymer. The tube was then placed without agitation into a silicon oil bath previously heated to 253° F. After 2.25 hours the solid POM copolymer was reacted completely into solution and the xanthan viscosity was broken.

Example 9—Polyacetal Homo-Polymer in 3 Component Heavy Brine 2.0 g of 41,000 MW POM homopolymer was placed into 18.0 g of a 15.7 pound per gallon three component brine (ZnBr2, CaBr2, and CaCl2) solution. Approximately 10% w of the tube contents being solid POM homopolymer. The tube was then placed without agitation into a silicon oil bath previously heated to 250° F. A gradual darkening of the solution took place over the first 8 hours, but there were no visible signs that the polymer had degraded. After 24 hours approximately ½ of the polymer had degraded and gone into solution. After 96 hours the majority of the polymer had going into solution with only traces remaining.

Example 10—Polyacetal Homo-Polymer in Brine with Dimethyl Sulfite 1.0 g of dimethyl sulfite was added to the solution produced in example 9 and all remaining traces of the polymer were reacted into solution rapidly within 10 minutes of being placed back in the silicon oil bath previously heated to 250° F.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method comprising:
   placing a sand control screen in a wellbore penetrating a subterranean formation, the sand control screen comprising an inducibly degradable composition comprising polyacetal; and
   activating an autocatalytic degradation of the polyacetal, the activating comprising contacting the sand screen with an inducer to form an alpha hydroxy sulfonic acid, the inducer comprising at least one of a sulfur dioxide and a sulfur dioxide precursor, wherein the inducer further comprises at least one of a strong acid, a halide, and a brine.

2. The method of claim 1, wherein the subterranean formation has a temperature in a range of from 120° F. to 320° F.

3. The method of claim 1, wherein the polyacetal has a crystallinity in the range of from 75% to 85%.

4. The method of claim 1, wherein the polyacetal is a co-polymer of trioxane and ethylene oxide.

5. The method of claim 1, wherein the inducibly degradable composition is a solid.

6. The method of claim 1, wherein the inducibly degradable composition is a coating on the sand control screen.

7. The method of claim 1, wherein the inducibly degradable composition further comprises at least one of: a strong acid and a halide.

8. The method of claim 1, wherein the sulfur dioxide or sulfur dioxide precursor is generated in the wellbore.

9. The method of claim 1, wherein the inducibly degradable composition further comprises formaldehyde.

10. The method of claim 1, wherein the inducer includes at least said brine.

11. The method of claim 10, wherein the brine comprises one or more of KCl, $ZnBr_2$, $CaBr_2$, and $CaCl_2$.

12. The method of claim 1, wherein the inducer includes at least said halide.

13. The method of claim 1, wherein the inducer includes at least said strong acid.

14. A method comprising: inducing an autocatalytic degradation of an inducibly degradable composition comprising polyacetal, wherein the inducing is performed in a wellbore that penetrates a subterranean earth formation and the inducibly degradable composition is a solid, wherein inducing degradation comprises contacting the inducibly degradable composition with an inducer to form an alpha hydroxy sulfonic acid, the inducer comprising at least one of a sulfur dioxide and a sulfur dioxide precursor, wherein the inducer further comprises at least one of a strong acid, a halide, and a brine.

15. The method of claim 14, wherein the solid is a sand control screen, a liner, a gasket, a ball sealer, a flow diverter, a flapper valve, or a plug.

16. The method of claim 15, wherein the solid comprises a sulfur dioxide precursor.

17. The method of claim 14, wherein the inducibly degradable composition further comprises formaldehyde.

18. The method of claim 14, wherein the inducer includes at least said brine.

19. The method of claim 18, wherein the brine comprises one or more of KCl, $ZnBr_2$, $CaBr_2$, and $CaCl_2$.

20. The method of claim 14, wherein the inducer includes at least said halide.

21. The method of claim 14, wherein the inducer includes at least said strong acid.

22. The method of claim 16, wherein the polyacetal has a crystallinity in the range of from 75% to 85%.

23. The method of claim 16, wherein the polyacetal is a co-polymer of trioxane and ethylene oxide.

24. The method of claim 16, wherein the polyacetal is a coating on a surface of the solid.

* * * * *